Feb. 25, 1941.        L. G. RANFT        2,232,969
CAMERA SHUTTER
Filed Dec. 23, 1939
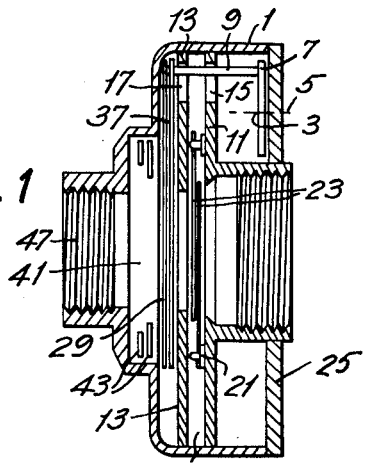
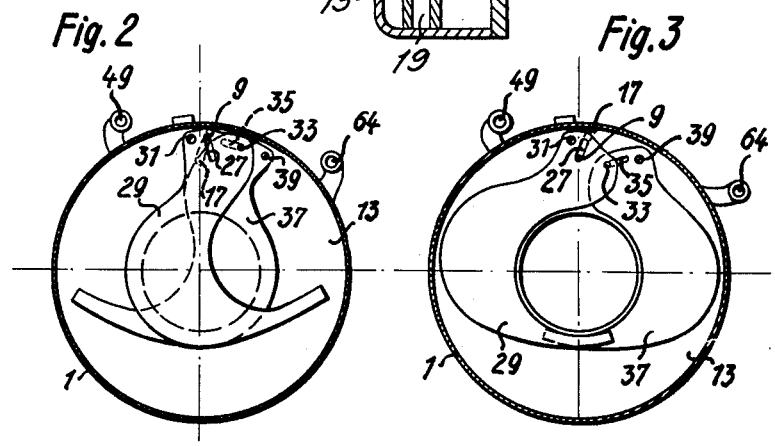
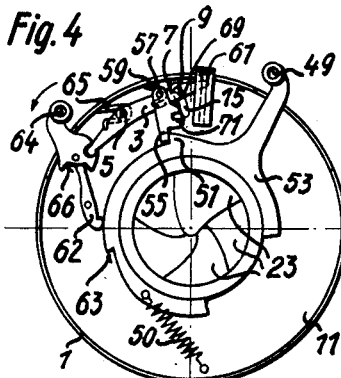
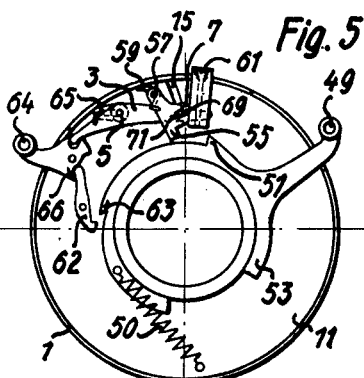
Inventor
Ludwig G. Ranft
By Cumpston & Shepard
Attorneys Patented Feb. 25, 1941

2,232,969

UNITED STATES PATENT OFFICE 2,232,969

CAMERA SHUTTER

Ludwig G. Ranft, Munich-Solln, Germany, assignor to Friedrich Deckel, Munich-Prinz Ludwigshohe, Bavaria, Germany Application December 23, 1939, Serial No. 310,757
In Germany December 23, 1938

7 Claims. (Cl. 95—63)

This invention deals with photographic shutters, and particularly with shutters of the objective type, placed at or near the lens of the camera.

The trend in high speed shutter design has been to make the shutter blades of smaller size, so that they have smaller inertias and can move faster. The reduction in the size of blades has necessitated an increase in the number of blades used, so that high speed shutters of modern design frequently have five or more blades, as compared to two or three blades usually found in older and slower shutters. The increase in the number of shutter blades has increased the number of the blade joints through which light might leak into the camera when the shutter is closed. This in itself might not be so serious if the speed of film emulsions had remained the same as in previous years, but with the tendency toward use of faster emulsions, small light leakages which would not be noticed on slower film will now produce a noticeable fogging of the film. Consequently, when a modern high speed shutter is used on a camera having very high speed film, and when the camera is held for some time in brilliant light, there is likely to be some fogging of the film by light entering between the closed shutter blades.

An object of the present invention is the provision of an improved shutter construction obviating such leakage of light.

Another object is the provision of a shutter construction having auxiliary means for protecting the camera against leakage of light, which auxiliary means is of simple and effective character and which is automatically moved out of the way approximately concurrently with the opening of the main shutter blades and automatically moved back into protecting position approximately concurrently with the closing of the main shutter blades.

To these and other ends the invention resides in certain improvements and combinations of parts, all as will be hereinafter more fully described, the novel features being pointed out in the claims at the end of the specification.

In the drawing:

Fig. 1 is a cross section taken approximately centrally through a shutter constructed in accordance with a preferred embodiment of the present invention;

Fig. 2 is a rear view of the shutter, with parts removed, showing the auxiliary blades in closed position;

Fig. 3 is a similar view showing the auxiliary blades in open position;

Fig. 4 is a front view of the shutter, with parts removed, showing the main blades in closed position, and Fig. 5 is a similar view showing the main blades in open position.

The same reference numerals throughout the several views indicate the same parts.

Except for the differences described below, the shutter of the present invention may be constructed in general the same as the shutter disclosed in United States Patent 1,687,123, granted October 9, 1928, for an invention of Deckel and Geiger. For example, the present shutter may comprise a casing 1, in which a lever 3 is pivoted on a pivot 5. One end 7 of this lever projects to the right of the pivot 5 when viewed from the front as in Figs. 4 and 5 and carries a pin 9 extending rearwardly (Fig. 1) through slots 15 and 17 in partitions 11 and 13 within the casing.

In the space 19 between the two partitions 11 and 13 is the usual blade operating ring 21 corresponding, for example, to the blade ring 14 of said Deckel patent, and in the usual manner it operates the main shutter blades 23, corresponding in general to the main shutter blades 12 of said Deckel patent, except that three shutter blades are shown in said Deckel patent, whereas five blades are illustrated in Fig. 4 of the present drawing. The present invention is not dependent upon the exact number of shutter blades employed, but as already indicated, the invention is particularly adapted to shutters having a large number of blades, for with an increase in the number of blades there is greater possibility of leakage of light, the prevention of which is the primary object of this invention.

The shutter is provided with a cover plate 25, corresponding in general to the cover plate 141 of said Deckel patent, and any suitable form of shutter operating mechanism, such as the mechanism shown in said Deckel patent, can be incorporated in the shutter casing, lying mainly in the space between the partition 11 and the cover plate 25. In the space to the rear of the partition 13, between it and the rear wall of the shutter casing, are two auxiliary shutter blades 29 and 37, pivoted respectively on pivots 31 and 39. The blade 29 has a slot 27 into which the previously mentioned pin 9 extends, for the purpose of moving the blade 29 through its opening and closing movements when the lever 3 is swung in one direction or the other. The blade 29 carries a pin 33 extending into a slot 35 of the other blade 37 and so arranged that movements of the blade 29 cause corresponding movements in the opposite direction of the other blade 37. The closed position of these auxiliary blades 29 and 37 is shown in Fig. 2, while their open position is indicated in Fig. 3.

In the space 41 to the rear of the auxiliary blades 29 and 31 there may be arranged the leaves 43 of the usual iris diaphragm, in known manner. The usual lens parts may be screwed into the lens mounts 45 and 47, or arranged in any other suitable way with respect to the shutter.

The usual setting lever of the shutter is indicated at 49, and corresponds to the setting lever 6 of said Deckel patent. It is formed as part of a ring shaped master member 53 rotatable around the lens tube and corresponding to the master member 5 of said Deckel patent. In setting the shutter, the setting lever 49 and master member 53 are moved in a clockwise direction when viewed as in Figs. 4 and 5, rotating around the lens tube and stretching or tensioning the main spring 50, until a shoulder 63 on the master member snaps over the hooked end of the latch 62, which holds the master member in its set or tensioned position until the latch is released.

The master member also has a shoulder 51 which, as the master member moves leftwardly, strikes against the lower end of a lever 55 pivoted within the shutter casing on a pivot 57, and provided with a spring 59 which tends constantly to move this lever in a counterclockwise direction. The nipple 61 into which the usual cable release (Bowden wire) may be screwed, serves as a stop limiting movement of the lever 55 in a counterclockwise direction as shown in Fig. 5. This lever 55 has a notch 71 which may receive a pin 69 projecting from the end 7 of the lever 3. A spring 65 associated with the lever 3 constantly tends to turn this lever in a counterclockwise direction about its pivot 5, to raise the end 7 and the pins 9 and 69, but when the pin 69 is engaged in the slot 71 of the lever 55, it is prevented from being raised by the spring 65.

The shutter release lever 64, corresponding in general to the release lever 101 of said Deckel patent, is pivoted in the usual manner, and has a recess engaging the left end of the lever 3, as shown in Figs. 4 and 5, so that downward releasing movement of the release member 64 from the position shown in Fig. 4 to the position shown in Fig. 5 will cause the left end of the lever 3 to be raised, turning this lever in a clockwise direction against the action of the spring 65 and lowering the right end 7 of the lever.

The same release member 64 also operates the latch 62, but as seen in Fig. 4, the upper end of the latch 62 is received in a wide notch in the lever 64, so that there is considerable lost motion between the latch and the release lever, with the result that when the release lever 64 is moved downwardly, it immediately moves the lever 3, but does not begin to move the latch 62 until near the end of the downward movement of the release member, when the shoulder 66 thereon strikes the end of the latch 62 and moves the latch to the release position shown in Fig. 5.

The right end 7 of the lever 3 projects into a slot in the cable release nipple 61, so that when a cable release is applied to this nipple, inward movement of the release plunger in the nipple 61 will move the right end of the lever 3 inwardly, turning the lever in a clockwise direction, and thereby turning the release lever 64 and producing exactly the same effects on the parts 3 and 62 as though the release member 64 had been operated by direct finger pressure.

The normal closed position of the shutter is the position shown in Figs. 2 and 4, with the main blades 23 closed and with the auxiliary blades 29 and 37 also closed, the two sets of blades together preventing any possibility of leakage or infiltration of light into the camera, even when the camera is held for a considerable time in bright sunlight. When the shutter is tensioned by moving the setting lever 49 and master member 53 in a clockwise direction from the position shown in Fig. 4 to the position shown in Fig. 5, both sets of shutter blades still remain closed, but the shoulder 51 on the master member is moved away from the end of the lever 55 so that this lever, under the influence of its spring 59, swings approximately to the position shown in Fig. 5.

When the operator is ready to take the picture, he depresses the release member 64 (or operates the cable release attached to the nipple 61) the first effect of which is to swing the lever 3 in a clockwise direction, moving the pin 9 down (that is, inwardly toward the center) and thereby opening the auxiliary shutter blades 29 and 37 from the position shown in Fig. 2 to the position shown in Fig. 3. At about the same time that these auxiliary blades become fully open, the lost motion between the member 64 and the latch 62 is taken up, and then the further movement of the member 64 swings the latch away from the shoulder 63 on the master member, releasing the master member so that, under the influence of its spring 50, it moves quickly in a counterclockwise direction, opening and closing the main shutter blades 23 in a manner already well known and as described, for example in said Deckel patent.

Meanwhile, at approximately the end of the downward movement of the release member 64, at about the same time that the latch 62 releases the shoulder 63 on the master member, the pin 69 on the lever 3 slightly displaces the lever 55 and then enters the notch 71 in this lever, which latches the member 3 in its actuated position and prevents upward movement of the pin 9 even if the cable release or the finger piece 64 should now be immediately released before the exposure is completed. The lever 3 remains latched by engagement of pin 69 in the latch 71 until near the end of the counterclockwise movement of the master member, and about the same time or just after the main shutter blades 23 close, the shoulder 51 on the master member strikes the end of the lever 55 and moves the lower end of this lever to the left from the position shown in Fig. 5 to the position shown in Fig. 4, releasing the pin 69 from the notch 71. The spring 65 immediately turns the lever 3 in a counterclockwise direction, raising the pin 9 and thus closing the auxiliary blades 29 and 37, assuming that finger pressure on the release member 64 has meanwhile been relieved.

With this construction, the slower auxiliary shutter opens approximately concurrently with each opening of the faster main shutter blades and closes approximately concurrently with the closing of the main shutter blades, yet the auxiliary shutter movements take place entirely automatically and the operator has nothing extra to do, over and above what he normally does to operate a shutter which is not equipped with the auxiliary blades. Since the auxiliary blades are not directly coupled to the main blades to move therewith, the mass or inertia of the auxiliary blades in no way retards the speedy action of the main blades. The length of exposure is still controlled entirely by the main blades, and the operating mechanism is adjustable to give different times of exposure as explained in said Deckel patent. Since the auxiliary blades do not have to operate as fast as the main blades, they can be made larger than the main blades and thus fewer blades can be used. Preferably at least two blades are used for the auxiliary shutter, but it is within the scope of this invention to use more than two blades in the auxiliary shutter, if desired.

By slight changes in the amount of lost motion provided between the latch 62 and the shoulder 66 on the release lever, and by changes in the placing of the shoulder 51 with respect to the lever 55, the blades of the slower or auxiliary shutter may be made to open simultaneously with the blades of the faster or main shutter and close after the closing of the blades of the main shutter, or the auxiliary shutter blades may be made to open ahead of the blades of the main shutter and close simultaneously with the closing of the blades of the main shutter, or the auxiliary shutter blades may be made to open a little ahead of and close a little after the main shutter blades, but in all of these possibilities it may be said in general that the auxiliary shutter blades open concurrently with the main shutter blades and close concurrently with the main shutter blades. This is an important advantage over constructions in which a light guard member is moved to an inoperative position when a camera is unfolded or otherwise made ready for use, because a substantial time interval may elapse before or after the actual exposure while the light guard is not in effective position, and this may be sufficient to allow enough infiltration of light, when the camera is held in brilliant sunshine, to cause fogging of the film.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention and the scope of the appended claims.

I claim:

1. A photographic shutter including a plurality of auxiliary blades shiftable from an overlapping position obstructing passage of light to an open position permitting passage of light, a plurality of main blades of greater number than said auxiliary blades and also shiftable from an overlapping position obstructing passage of light to an open position, and operating mechanism for opening said auxiliary blades concurrently with each opening movement of said main blades and for closing said auxiliary blades concurrently with each closing movement of said main blades.

2. A photographic shutter including a series of approximately flat main blades mounted for oscillating movement substantially in their own planes between open and closed positions, a plurality of approximately flat auxiliary blades fewer in number and larger in size than the main blades and also mounted for oscillating movement substantially in their own planes between open and closed positions, mechanism for opening and closing the main blades at a speed determining the length of the exposure, and means for automatically opening and closing the auxiliary blades concurrently with each actuation of the main blades, said auxiliary blades remaining open for a slightly longer time than the exposure time determined by the action of the main blades.

3. A photographic shutter including a plurality of main blades movable between closed and open positions, a plurality of auxiliary blades also movable between closed and open positions, a master member for operating said main blades, said master member being shiftable to a tensioned position to condition the shutter for making an exposure, a movable release member for releasing said master member from said tensioned position to make an exposure, means operated by movement of said release member toward release position for opening said auxiliary blades, and means controlled by movement of said master member for closing said auxiliary blades.

4. A photographic shutter including a plurality of main blades movable between closed and open positions, a plurality of auxiliary blades also movable between closed and open positions, a master member for operating said main blades, said master member being shiftable to a tensioned position to condition the shutter for making an exposure, a movable release member for releasing said master member from said tensioned position to make an exposure, means operated by movement of said release member toward release position for opening said auxiliary blades, means for latching said auxiliary blades in open position, and means operated by said master member approximately at the completion of an exposure for releasing said latch means.

5. A photographic shutter including a plurality of main blades movable between closed and open positions, a plurality of auxiliary blades also movable between closed and open positions, a master member for operating said main blades, said master member being shiftable to a tensioned position to condition the shutter for making an exposure, a movable release member for releasing said master member from said tensioned position to make an exposure, spring means tending to maintain said auxiliary blades in closed position, means operated by movement of said release member toward release position for opening said auxiliary blades against the tension of said spring means, means for latching said auxiliary blades in open position, and means operated by said master member approximately at the completion of an exposure for releasing said latch means.

6. A photographic shutter including a plurality of main blades movable between closed and open positions, a plurality of auxiliary blades also movable between closed and open positions, a master member for operating said main blades, said master member being shiftable to a tensioned position to condition the shutter for making an exposure, a movable release member for releasing said master member from said tensioned position to make an exposure, means for opening said auxiliary blades concurrently with the opening of said main blades, and means operated by said master member for closing said auxiliary blades.

7. A photographic shutter including a plurality of main blades movable between closed and open positions, a plurality of auxiliary blades also movable between closed and open positions, a master member for operating said main blades, said master member being shiftable to a tensioned position to condition the shutter for making an exposure, a movable release member for releasing said master member from said tensioned position to make an exposure, means operated by movement of said release member toward release position for opening said auxiliary blades, and means for closing said auxiliary blades concurrently with the closing of said main blades.

LUDWIG G. RANFT.